United States Patent [19]

Demangeon et al.

[11] Patent Number: 4,576,648

[45] Date of Patent: Mar. 18, 1986

[54] CATIONIC EMULSIONS OF BITUMINOUS BINDERS OF THE BITUMEN TYPE AND THEIR PROCESS OF PREPARATION

[75] Inventors: Francis Demangeon, Dardilly;
Germain Hagenbach, Vernaison; Paul Maldonado, Saint Symphorien d'Ozon, all of France

[73] Assignee: Elf France, Paris, France

[21] Appl. No.: 742,635

[22] Filed: Jun. 7, 1985

Related U.S. Application Data

[63] Continuation of Ser. No. 637,323, Aug. 2, 1984, abandoned, which is a continuation of Ser. No. 445,255, Nov. 29, 1982, abandoned.

[30] Foreign Application Priority Data

Nov. 27, 1981 [FR]  France ............................. 81 22275

[51] Int. Cl.$^4$ ......................... C08L 5/00; C08L 95/00
[52] U.S. Cl. ..................................... 106/269; 524/59; 524/60; 524/61
[58] Field of Search ..................... 106/269; 524/59–61

[56] References Cited

U.S. PATENT DOCUMENTS

| | | | |
|---|---|---|---|
| 3,867,162 | 2/1975 | Elste | 106/277 |
| 3,951,676 | 4/1976 | Elste | 106/277 |
| 4,007,127 | 2/1977 | Smadja | 106/277 |
| 4,018,730 | 4/1977 | McDonald | 524/60 |
| 4,333,866 | 6/1982 | Uffner | 525/54.5 |
| 4,340,518 | 7/1982 | Nolte | 524/61 |

FOREIGN PATENT DOCUMENTS 0031526  8/1974  Japan ..................................... 524/61

*Primary Examiner*—Theodore Morris
*Attorney, Agent, or Firm*—Burgess, Ryan & Wayne

[57] ABSTRACT

Cationic emulsions of bituminous binders of the type consisting of an organic phase formed of a bituminous binder dispersed in an aqueous phase containing a cationic emulsifying agent and an acid.

The bituminous binder is a bitumen-polymer type binder and the acid present in the aqueous phase is a possibly hydroxylated mono or polycarboxylic acid, used in sufficient quantity that the pH of the said aqueous phase is comprised between 1 and 7.

The bituminous binders of the bitumen-polymer type having passed through the said emulsions present an excellent aging behavior.

17 Claims, No Drawings

CATIONIC EMULSIONS OF BITUMINOUS BINDERS OF THE BITUMEN TYPE AND THEIR PROCESS OF PREPARATION

This application is a continuation of application Ser. No. 637,323, filed Aug. 2, 1984 which is a continuation of application Ser. No. 445,255 filed Nov. 29, 1982 both now abandoned.

The present invention concerns "bitumen-polymer" type cationic emulsions of bituminous binders, for which the aging property of the binder is substantially improved.

The obtention of cationic or anionic emulsions from bituminous binders is a well-known technique. The emulsion consists of a dispersion of fine globules of the binder in a continuous aqueous phase. The emulsion is called anionic when its pH is higher than 7 and cationic when its pH is at most 7.

The formation of an emulsion from bituminous binders involves the use of emulsifying agents that produce a dispersion of the binder globules in the aqueous phase and prevent their agglomeration.

In the case of anionic emulsions, the emulsifying agent is of the anionic type and consists, especially, of a fatty acid alkaline salt. The fatty acid is generally mixed with the bituminous binder in quantities varying from 0.05 to 2% by weight. The binder mixed with the fatty acid to is then passed an emulsifying apparatus to be dispersed in an aqueous phase comprising alkali containing water.

In the case of cationic emulsions, the emulsifier is of the cationic type and consists, for example, of a fatty amine, a fatty amido-acid, or further an imidazoline. The emulsifying agent is generally dispersed in water to which has been added hydrochloric acid. The hydrochloride that is formed is water soluble.

The homogeneous solution obtained, the pH of which is generally comprised between 1 and 5, is then contacted with the bituminous binder in an emulsifying apparatus in order to form an emulsion.

The emulsion, whether it is cationic or anionic, is considered as a means for decreasing the viscosity of the bituminous binders After the emulsion is broken, the properties of the initial bitumenous binder including the emulsifier used for the manufacture of the emulsion return. The presence of the emulsifier in the bituminous binder is supposed to exert a favorable effect on the adhesiveness of the binder to the granulates which it contacts.

It is known that bituminous binders comprised solely of bitumen are often replaced by bitumen-polymer type bituminous binders. These bitumen-polymer binders are products obtained from bitumen mixed with polymers and possibly modified by these polymers in the presence of a reactive material such as sulfur or another modifying agent, and of an additive.

Examples of bitumen-polymer type bituminous binders include especially:

bitumens modified by olefinic polymers or mixtures of fatty acids and higher alcohols (French Pat. No. 7627936—published under No. 2364960, filed Sept. 17, 1976);

bitumens modified as above on which are grafted elastomers (French Pat. No. 7627937—published under No. 2364961, filed Sept. 17, 1976);

bitumens modified by norbornene (French Pat. No. 7630316—published under No. 2367102, filed Oct. 8, 1976);

bitumens modified by dihalogenopolybutadienes acting as reception structures for block copolymers and co-vulcanisable elastomers (French Pat. No. 7806160—published under No. 2418812, filed on Mar. 3, 1978);

bitumens modified by styrene/butadiene or styrene/isoprene block copolymers (French Pat. No. 7639233—published under No. 2376188, filed on Dec. 28, 1976);

bitumens modified by polystyrene/carboxylated polydiene block copolymers (certificate of Addition No. 7831689—published under No. 2440967, filed on Nov. 9, 1978 as an addition to French Pat. No. 7639233);

bitumens modified by polyethylene waxes (French Pat. No. 7729953—published under No. 2405288, filed on Oct. 5, 1977);

bitumens modified by elastomer acrylic polymers (French Pat. No. 7812135—published under No. 2424301, filed on Apr. 25, 1978);

bituminous compositions obtained by contacting bitumen with a mother-solution containing styrene/butadiene block copolymers and sulfur (French Pat. No. 7818534—published under No. 2429241, filed on June 21, 1978, or other reactive agent, as well as a petroleum cut or a coal oil;

bitumen modified by ethylene/vinyl acetate copolymers.

When cationic emulsions of bituminous binders are prepared in which the binder is of the bitumen-polymer type, it is observed that the passage through the emulsion form modifies the aging behavior of the bitumen-polymer binder, which is in this case not as good as that of the same bitumen-polymer binder that has not been emulsified.

This difference of aging behavior becomes evident by analysis of the characteristics of the bitumen-polymer binder before and after the "Rolling Film Oven Test" (for short "RTFO test") defined in standard ASTMD 2872 and modified in order to bring the duration of the heat treatment to 150 minutes. When the binder passes through the emulsion form, firstly, breaking the emulsion occurs and then it is dried by evaporation of the water. This is carried out by application of the emulsion to a metallic sheet to form a film of 2 mm thickness, then drying by water evaporation at 50° C. for 4 hours.

The degradation of the aging behavior of the bitumen-polymer type bituminous binders, after passage through the emulsion form, was observed whatever the chemical nature of the cationic emulsifier used, among which can be cited fatty amine, alkylamidoamine, imidazoline, for the various bitumen-polymer binders cited herein-above, and especially for the bitumen-polymers selected from among the mixtures of a mother solution containing the polymer and a reactive, for example sulfur, with a bitumen, mixtures of bitumens and styrene/butadiene/styrene block copolymers (for short SBS), mixtures of bitumens with ethylene/vinyl acetate copolymers, or further bitumen emulsion/latex emulsion mixtures.

It was found that it was possible to prevent the harmful influence of the emulsification on the aging of the bitumen-polymer binders, using cationic emulsions in which the acid used is a carboxylic acid.

BRIEF SUMMARY OF THE INVENTION

The cationic emulsions of the bituminous binders according to the invention are of the type consisting of an organic phase formed of a bituminous binder dispersed in an aqueous phase containing a cationic emulsifying agent and an acid, and are characterized in that the bituminous binder is a bitumen-polymer type binder and that the acid present in the aqueous phase is a mono or polycarboxylic acid, possibly hydroxylated, used in such a quantity that the pH of the said aqueous phase has a value comprised between 1 and 7.

DETAILED DESCRIPTION OF THE INVENTION

By bitumen-polymer type bituminous binder, is meant according to the invention one of any of the products obtained from bitumens mixed with polymers and possibly modified by said polymers in the presence or not of a reactive material such as sulfur or another modifying agent such as a linking agent or vulcanisation agent, and possibly of an additive such as a petroleum cut or coal oil.

Preferred bituminous binders of the bitumen-polymer type used to provide cationic emulsions according to the invention are selected from among the various bitumens modified by the polymers that are cited hereinabove by way of example.

The mono or polycarboxylic acids used in the cationic emulsions of the invention can be selected from among saturated or non saturated, possibly hydroxylated, mono or polycarboxylic acids of the $C_1$ to $C_{20}$ and preferably $C_1$ to $C_{12}$ aliphatic type, of the $C_4$ to $C_{12}$ alicyclic type or $C_7$ to $C_{12}$ aromatic type, the acids being especially mono, di- or tri-carboxylic acids, possibly hydroxylated.

Among the mono and polycarboxylic acids, possibly hydroxylated, of the $C_1$ to $C_{20}$ saturated or non saturated aliphatic type, can be cited by way of non-limitative example, mono-carboxylic acids such as formic, acetic, propanoic, butanoic, hexanoic or dodecanoic acid, dicarboxylic acids such as oxalic, malonic, succinic, glutaric, adipic, pimelic, malic, tartric, maleic, fumaric, mesaconic, itaconic, tricarboxylic acids such as butane tricarboxylic acid or citric acid.

Examples of mono-, di- or tricarboxylic alicyclic or aromatic acids of the type mentioned herein-above are such as cyclo-propane carboxylic acid, cyclo-pentane carboxylic acid, cyclo-hexane carboxylic acid, hexahydrophtalic acid, benzoic acid, salicylic acid, phthalic acids. A group of preferred acids comprises formic, acetic, oxalic, succinic, phthalic, tartric, citric and maleic acids.

The cationic emulsifying agent can be one of any known cationic emulsifying agents. This agent is more particularly selected from among the group of aliphatic amines, especially fatty amines, imides, alkylamidoamines, and imidazolines. In particular, can be used emulsifiers of the N-alkylpolyamine type of the general formula:

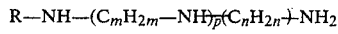

or further of the amidoamine type of the general formula:

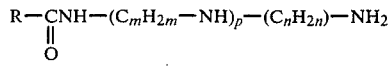

in which:
R is a $C_1$ to $C_{20}$ and preferably $C_8$ to $C_{20}$ aliphatic radical;
m and n are integers ranging from 1 to 8, and preferably 1 to 6, and
p is an integer from 0 to 6, and particularly from 0 to 3.

Preferred emulsifying agents have the following formulae:

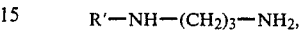

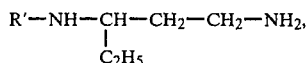

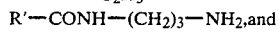

in which:
R' is a $C_{12}$ to $C_{20}$ aliphatic radical, the said radical being especially a stearyl or oleyl radical.

The quantity of the emulsifying agent can vary within wide limits.

It can advantageously represent 0.03% to 0.6% by weight of the emulsion.

The cationic emulsions according to the invention are prepared by producing, in an emulsion formation zone and especially in an emulsifying apparatus a homogenous dispersion of the bitumen-polymer bituminous binder in an aqeuous solution of a carboxylate of the emulsifying agent containing a quantity of free carboxylic acid sufficient for the pH to be comprised between 1 and 7. The emulsion is formed by introducing simultaneously and separately into the emulsion formation zone, the bitumen-polymer bituminous binder in the form of a molten mass at a temperature comprised between 80° C. and 180° C., and preferably between 120° C. and 160° C., and on the other hand, the acid aqueous solution of the carboxylate of the emulsifying agent at a temperature comprised between 15° C. and 80° C., and preferably between 20° C. and 60° C.; the mixture is maintained in the said zone for a time sufficient to form an emulsion.

In order to prepare the acid aqueous solution of the carboxylate of the emulsifying agent having a pH comprised between 1 and 7, the carboxylic acid, either in solid state or, furthermore, in the form of an aqueous solution, is added in a controlled quantity to the aqueous solution or dispersion of the emulsifying agent in order to form the carboxylate of the emulsifying agent, which is water-soluble, and to preserve in the carboxylate aqueous solution enough free acid to bring the pH of the said aqueous solution to the desired value between 1 and 7.

The acid aqueous solution of the carboxylate of the emulsifying agent and the bitumen-polymer bituminous binder are brought to the emulsion formation zone in proportions such that the resulting emulsion advantageously contains, by weight, 30 to 80% and, preferably, 55 to 75%, of the bitumen-polymer bituminous binder.

The obtained emulsion, leads, after breaking, to a bitumen-polymer binder of which the aging behavior is identical to that of the polymer-bitumen binder which was not emulsified.

The invention is illustrated by the following non-limitative examples.

In these examples, unless indication is given to the contrary, the proportions and percentages are defined by weight.

Examples 1 to 3, the results of which are given in Table I, are standard examples having the aim of illustrating the difference of the aging behavior of the bitumen-polymer bituminous binders have passed through the emulsion form.

EXAMPLE 1

The bitumen-polymer bituminous binder is a composition of a binder for superficial coating, such as described in French Pat. No. 7818534. This binder is constituted by mixture of a bitumen with a mother solution containing the polymer and a reactive agent. This mixture is thereafter brought to a temperature high enough to initiate the reaction between the reactive agent, the polymer and the bitumen. The reactive agent, is sulfur, a linking or vulcanisation agent.

The mother solution used in this example is constituted by a petroleum cut and more precisely a cut called "Light Cycle Oil", obtained in a refinery after catalytic cracking of the heavy distillates; this essentially aromatic cut has a distillation range from 180° C. to 360° C. The polymer used in this example is a styrene/butadiene block copolymer containing 25% styrene, of which 18% block polystyrene, and 75% polybutadiene.

Twenty parts of this polymer are dissolved in 80 parts of the petroleum cut at a temperature comprised between 80° C. and 100° C. After complete dissolution of the polymer, 0.6 parts of sulfur are added to the solution. Fifteen parts of the solution thus prepared are mixed with 85 parts of a 80/100 penetration road bitumen. The mixture is brought to a temperature comprised between 170° C. and 180° C. during about 1½ hours. A fluid bitumen-polymer binder is thus obtained of which the main characteristics are indicated in line 1 of Table I.

The bitumen-polymer binder described in this example is subject to the RTFO aging test (ASTM D 2872/70) during 150 minutes. The recovered product is analysed. The results are shown in line 2 of Table I.

The bitumen-polymer of this example is thereafter used to form a cationic emulsion. A dispersion, in water, of 0.2% of a fatty amine, consisting of a mixture, in substantially equal proportions, of oleyl or stearyl 1,3-diamine propane of the formula:

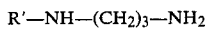

wherein R' represents a stearyl or oleyl radical. The fatty amine is acidified by sufficient HCl (d=1.16) to lower the pH of the dispersion to value 2. The addition of HCl leads to the formation of the amine hydrochloride that is water-soluble.

In an emulsifier or emulsifying apparatus are simultaneously introduced 350 parts of the hydrochloride solution brought to 40° C. and 650 parts of the bitumen-polymer binder brought to 150° C. 1000 parts of a cationic emulsion of the bitumen-polymer binder is thus obtained.

This emulsion is spread out to form a film of 2 mm thickness on a metallic sheet and maintained at 50° C. for 4 hours in a ventilated oven. The residual bitumen-polymer binder is recovered and analysed. The results are shown in line 3 of Table I. It is observed, by comparing this line with line 1 that the emulsification did modify the initial characteristics of the binder.

The recovered bitumen-polymer is subjected to the RTFO aging test during 150 mn, then analysed. The results are shown in line 4 of Table I.

It is observed that the properties such as penetration, softening point and Fraass point have not been affected by the emulsification (comparison of lines 2 and 4 of Table I). The difference, however, appears in the traction test, which makes obvious an important loss of elasticity as indicated by the drop to zero of the value of breaking strength which was $0.68 \times 10^5$ Pascals, while its breaking extension is 800%.

EXAMPLE 2

The same bitumen-polymer binder as that used in Example 1 is prepared in a cationic emulsion form by using as an emulsifier an alkylamidoamine consisting of a mixture in substantially equal molar proportions of stearyl-amidoamine and oleylamidoamine of the formula:

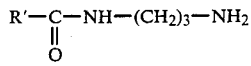

in which R' represents a stearyl and oleyl radical. The emulsifier is used in a quantity of 1.8 g per kilo emulsion, the other conditions being identical to those described in Example 1.

The bitumen-polymer binder obtained after breaking and drying of the emulsion presents the characteristics indicated in line 5 of Table I. After having been subjected to the RTFO aging test, it presents the characteristics indicated in line 6 of Table I.

The loss of elasticity as shown by the value of breaking strength is identical to that observed in the example described in line 4 of Table I.

EXAMPLE 3

The influence of emulsification on the aging behavior of the bitumen-polymer binders was also apparent in the case of bitumen-polymer binders others than that described in Example I.

Line 7 of Table I shows the results obtained after RTFO aging of a mixture of bitumen (penetration 80/100) with 3% of a styrene/butadiene/styrene triblock copolymer, emulsification of the mixture in a formulation analogous to that described in Example 1.

EXAMPLE 4

In this example according to the invention, the bitumen-polymer binder described in Example 1 is prepared as a cationic emulsion in the following way:

A dispersion is prepared of 0.19% of the fatty amine of Example 1 in water and this dispersion is acidified by acetic acid (96% acid solution of a density equal to 1.06) until the pH of the medium is lowered to 4.5. In an emulsifying apparatus is introduced 350 parts of the obtained aqueous solution brought to 40° C. and 650 parts of the bitumen-polymer binder brought to 150° C. are emulsified.

The emulsion thus obtained is spread in a film of 2 mm thickness on a metallic sheet and brought to 50° C. for 4 hours in a ventilated oven. The residual bitumen polymer binder is recovered and analyzed. The results are shown in line 1 of Table II. The comparison of these results with those of line 5 of Table I shows emulsification using acid in the water phase the initial characteristics of the binder.

road bitumen (penetration 60/70) brought to 180° C. The homogenous solution thus obtained is fluidized by the addition of 10% of a 200/300 type anthracenic coal oil.

TABLE I

| Nature of the bitumen-polymer and subjected treatment | Penetration at 25° C. NF T 66.004 (1/10 mm) | Softening point NF T 66.008 (°C.) | Fraass Point IP 80/53 (°C.) | Viscosity at 160° C. (poises) | Pseudo viscosity at 50° C., orifice 10 mm NF T 66.005 (seconds) |
|---|---|---|---|---|---|
| Bitumen-polymer of Example 1 | | | | 0.89 | 115 |
| Bitumen-polymer of Example 1 subjected to RTFO test during 150 mn | 57 | 58 | −17 | | |
| Bitumen-polymer of Example 1 after passage through the cationic emulsion then breaking and drying of the emulsion | | | | 0.92 | 116 |
| Previous bitumen-polymer subjected to RFTO test during 150 mn | 54 | 59 | −19 | | |
| Bitumen-polymer of Example 2 after passage through the cationic emulsion then breaking and drying of the emulsion | | | | 0.90 | 113 |
| Bitumen-polymer previously subjected to RTFO test during 150 mn | 60 | 57 | −20 | | |
| SBS Bitumen-polymer after passage through the cationic emulsion and aging by RTFO during 150 mn | 64 | 57 | −18 | | |

| Nature of the bitumen-polymer and subjected treatment | Traction Test | | | | | |
|---|---|---|---|---|---|---|
| | T (°C.) | Speed (mm/mn) | $\sigma s$ (Pascals) | $\sigma r$ (Pascals) | $\epsilon s$ % | $\epsilon r$ % |
| Bitumen-polymer of Example 1 | −10 | 500 | $5.7 \times 10^5$ | $1.07 \times 10^5$ | 20 | >900 |
| Bitumen-polymer of Example 1 subjected to RTFO test during 150 mn | 20 | 500 | $1.72 \times 10^5$ | $0.68 \times 10^5$ | 25 | >900 |
| Bitumen-polymer of Example 1 after passage through the cationic emulsion then breaking and drying of the emulsion | −10 | 500 | $5.7 \times 10^5$ | $1.1 \times 10^5$ | 20 | >900 |
| Previous bitumen-polymer subjected to RFTO test during 150 mn | 20 | 500 | $2.07 \times 10^5$ | 0 | 25 | 800 |
| Bitumen-polymer of Example 2 after passage through the cationic emulsion then breaking and drying of the emulsion | −10 | 500 | $5.5 \times 10^5$ | $1.05 \times 10^5$ | 20 | >900 |
| Bitumen-polymer previously subjected to RTFO test during 150 mn | 20 | 500 | $1.05 \times 10^5$ | 0 | 30 | 700 |
| SBS Bitumen-polymer after passage through the cationic emulsion and aging by RTFO during 150 mn | 20 | 500 | $1.96 \times 10^5$ | $0.02 \times 10^5$ | 25 | 800 |

$\sigma s$ = strain at threshold
$\sigma r$ = strain on breaking point
$\epsilon s$ = elongation at threshold
$\epsilon r$ = elongation at breaking point The recovered bitumen-polymer is subjected to the RTFO aging test (ASTM D 2872/70) during 150 mn, then analyzed. The results are set out in Table II, line no. 2. The comparison of these results with those given in line no. 2 of Table I shows that, in this case, emulsification does not modify the aging behavior of the bitumen-polymer.

EXAMPLE 5

In this example according to the invention, a bitumen-polymer binder is manufactured by dispersing, by stirring, during about 1 hour, 50 parts of ethylene/vinyl acetate copolymer, at 45% vinyl acetate, in 950 parts of road bitumen (penetration 60/70) brought to 180° C. The homogenous solution thus obtained is fluidized by the addition of 10% of a 200/300 type anthracenic coal oil.

This product is then prepared in cationic emulsion with an aqueous solution of a fatty amine oxalate. This aqueous solution is prepared by adding to 700 parts of water, 4 parts of amine of the formula:

in which R' is a stearyl radical, and 5 parts of solid oxalic acid. Several minutes of stirring at 50° C. leads to a homogenous solution of amine oxalate. The pH of this solution is about 1.8.

350 parts of the amine oxalate solution are emulsified with 650 parts of the previously prepared bitumen-polymer binder by the method of Examples 1 and 2.

The bitumen-polymer binder of this example is subjected to the RTFO aging test described in the previous examples. It leads to an aged product, the characteristics of which are shown in line 3 of Table II.

After stirring, a limpid solution is obtained the pH of which is equal to 2.05.

In an emulsifying apparatus is simultaneously introduced 350 parts of the solution thus obtained brought to 40° C. and 650 parts of a bitumen-polymer binder identical to that used in Example 1, the said binder being brought to 150° C. 1000 parts of a cationic emulsion of

TABLE II

| Nature of the bitumen-polymer and its treatment | Penetration at 25° C. NF T 66.004 (1/10 mm) | Softening point NF T 66.008 (°C.) | Fraass Point IP 80/53 (°C.) | Viscosity at 160° C. (poises) | Pseudo viscosity at 50° C., orifice 10 mm NF T 66.005 (seconds) |
|---|---|---|---|---|---|
| Bitumen-polymer of Example 4 after passage through the acetic emulsion then breaking and drying of the emulsion | | | | 0.94 | 115 |
| Previous Bitumen-polymer subjected to RTFO aging test during 150 mn | 55 | 57 | −19 | | |
| Bitumen-polymer of Example 5 subjected to RTFO aging test during 150 mn | 45 | 61 | −12 | | |
| Bitumen-polymer of Example 5 after passage through the oxalic emulsion then aging of the binder by RTFO test | 47 | 60 | −13 | | |

| | | Traction Test | | | | | |
|---|---|---|---|---|---|---|---|
| Nature of the bitumen-polymer and its treatment | | T (°C.) | Speed (mm/mn) | $\sigma_s$ (Pascals) | $\sigma_r$ (Pascals) | $\epsilon_s$ % | $\epsilon_r$ % |
| Bitumen-polymer of Example 4 after passage through the acetic emulsion then breaking and drying of the emulsion | | −10 | 500 | $5.7 \times 10^5$ | $1.1 \times 10^5$ | 20 | >900 |
| Previous Bitumen-polymer subjected to RTFO aging test during 150 mn | | 20 | 500 | $1.8 \times 10^5$ | $0.71 \times 10^5$ | 25 | >900 |
| Bitumen-polymer of Example 5 subjected to RTFO aging test during 150 mn | | 20 | 500 | $3.1 \times 10^5$ | $0.15 \times 10^5$ | 20 | >900 |
| Bitumen-polymer of Example 5 after passage through the oxalic emulsion then aging of the binder by RTFO test | | 20 | 500 | $2.9 \times 10^5$ | $0.1 \times 10^5$ | 20 | >900 |

The oxalic emulsion of the bitumen-polymer binder after rupture and drying gives rise to a binder that is also subjected to the same aging test. The characteristics of the product obtained at the issue of the test are given in line 4 of Table II. These characteristics may be considered identical to those given in line 3 of Table II.

EXAMPLE 6

In this example according to the invention, 2 parts of the fatty amine used in Example 1 are dispersed in 346 parts of water. This dispersion is brought to 40° C., then 2 parts of pure technical grade maleic acid are added.

the bitumen-polymer binder are obtained.

This emulsion is thereafter broken and dried in a film of 2 mm thickness in conditions similar to those of Example 1. The residual bitumen-polymer binder is recovered and analysed.

The results are shown in line 3 of Table III. It is observed, by comparing this line with line 1., emulsification does not modify the initial characteristics of the binder.

The bitumen-polymer binder recovered after breaking of the emulsion is subjected to the RTFO aging test then analysed. The results are given in line 4 of Table III. It is observed that all the properties

TABLE III

| Nature of the bitumen-polymer and its treatment | Penetration at 25° C. NF T 66.004 (1/10 mm) | Softening point NF T 66.008 (°C.) | Fraass Point IP 80/53 (°C.) | Viscosity at 160° C. (poises) | Pseudo viscosity at 50° C., orifice 10 mm NF T 66.005 (seconds) |
|---|---|---|---|---|---|
| Bitumen-polymer of Example 1 | | | | 0.89 | 115 |
| Bitumen-polymer of Example 1 subjected to the RTFO test during 150 mn | 57 | 58 | −17 | | |
| Bitumen-polymer of Example 1 after passage through the cationic emulsion then breaking and drying of the emulsion according to | | | | 0.90 | 113 |

TABLE III-continued

| | | | |
|---|---|---|---|
| Example 6 | | | |
| Previous Bitumen-polymer subjected to the RTFO during 150 mn | 55 | 60 | −18 |
| Bitumen-polymer of Example 1 after passage through the cationic emulsion using citric acid then breaking and drying of the emulsion according to Example 7 | | | 0.92      110 |
| Previous Bitumen-polymer subjected to RTFO test during 150 mn | 57 | 59 | −18 |

| Nature of the bitumen-polymer and its treatment | Traction Test | | | | | |
|---|---|---|---|---|---|---|
| | T (°C.) | Speed (mm/mn) | $\sigma s$ (Pascals) | $\sigma r$ (Pascals) | $\epsilon s$ % | $\epsilon r$ % |
| Bitumen-polymer of Example 1 | −10 | 500 | $5.7 \times 10^5$ | $1.07 \times 10^5$ | 20 | >900 |
| Bitumen-polymer of Example 1 subjected to the RTFO test during 150 mn | 20 | 500 | $1.72 \times 10^5$ | $0.68 \times 10^5$ | 25 | >900 |
| Bitumen-polymer of Example 1 after passage through the cationic emulsion then breaking and drying of the emulsion according to Example 6 | −10 | 500 | $5.6 \times 10^5$ | $1 \times 10^5$ | 20 | >900 |
| Previous Bitumen-polymer subjected to the RTFO during 150 mn | 20 | 500 | $1.95 \times 10^5$ | $0.6 \times 10^5$ | 25 | >900 |
| Bitumen-polymer of Example 1 after passage through the cationic emulsion using citric acid then breaking and drying of the emulsion according to Example 7 | −10 | 500 | $5.5 \times 10^5$ | $0.98 \times 10^5$ | 25 | >900 |
| Previous Bitumen-polymer subjected to RTFO test during 150 mn | 20 | 500 | $1.8 \times 10^5$ | $0.65 \times 10^5$ | 25 | >900 | of the product after aging are identical to those of the product not emulsified (comparison of lines 4 and 2 of Table III).

EXAMPLE 7

In this example according to the invention, 2 parts of the fatty amine used in Example 1 are dispersed in 346 parts of water. This dispersion is brought to 40° C., then 2 parts of technical quality pure citric acid are added. After stirring, a solution is obtained having a pH is of 2.9.

Into an emulsifying apparatus are simultaneously introduced 350 parts of the obtained aqueous solution brought to 40° C. and 650 parts of a bitumen-polymer binder identical to that used in Example 1, the said binder being brought to 140° C. At the exit 1000 parts of a bitumen-polymer cationic emulsion are obtained.

This emulsion is thereafter broken and dried as 2 mm film under conditions analogous to those of Example 1. The residual bitumen-polymer binder is recovered and analysed.

The results are shown in line 5 of Table III. It is observed by comparing this line with line 1, that emulsification does not modify the initial characteristics of the binder.

The recovered bitumen-polymer after breaking of the emulsion is subjected to the RTFO aging test, then analysed. The results are compiled in line 6 of Table III. It is noted that the properties of the product after aging are identical to those of the product which was not passed emulsified.

We claim:

1. A cationic emulsion of a bituminous binder comprising: a bituminous binder dispersed in an aqueous phase containing a cationic emulsifying agent and an acid, said acid being present in an amount sufficient to provide an aqueous phase having a pH of from 1 to 7, wherein the bituminous binder is at least one member selected from the group consisting of a homogeneous solution of bitumen and at least one polymer, bitumen modified by at least one polymer, bitumen modified by at least one polymer in the presence of a reactive agent, and bitumen modified by at least one polymer in the presence of a reactive agent and an additive, and wherein the acid consists essentially of at least one carboxylic acid selected from the group consisting of $C_1$ to $C_{20}$ saturated aliphatic monocarboxylic acids, $C_2$ to $C_{20}$ saturated aliphatic polycarboxylic acids, $C_2$ to $C_{20}$ unsaturated aliphatic monocarboxylic acids, $C_2$ to $C_{20}$ unsaturated aliphatic polycarboxylic acids, saturated $C_4$ to $C_{12}$ alicyclic monocarboxylic acids, saturated $C_4$ to $C_{12}$ alicyclic polycarboxylic acids, unsaturated $C_4$ to $C_{12}$ alicyclic monocarboxylic acids, unsaturated $C_4$ to $C_{12}$ alicyclic polycarboxylic acids, $C_7$ to $C_{12}$ aromatic monocarboxylic acids, $C_7$ to $C_{12}$ aromatic polycarboxylic acids and hydroxyl derivatives of said acids.

2. An emulsion of claim 1, wherein at least one carboxylic acid is selected from the group consisting of monocarboxylic acids, dicarboxylic acids, tricarboxylic acids and hydroxylated derivatives thereof.

3. An emulsion of claim 1 wherein the emulsifying agent is selected from the group consisting of aliphatic amines, imides, alkylamidoamines and imidazolines.

4. An emulsion of claim 1 wherein the cationic emulsifying agent is of the formula:

$$R-NH\text{-}[C_mH_{2m}-NH]_p[C_nH_{2n}]\text{-}NH_2 \text{ or}$$
$$R-CONH\text{-}[C_mH_{2m}-NH]_p[C_nH_{2n}]\text{-}NH_2$$

in which:
R is a $C_1$ to $C_{20}$ aliphatic radical; m and n are integers from 1 to 8; and, p is an integer from 0 to 6.

5. An emulsion of claim 4 wherein R is a $C_8$ to $C_{20}$ aliphatic radical.

6. An emulsion of claim 4 wherein m and n are integers of from 1–6.

7. An emulsion of claim 4 wherein p is an integer of from 0 to 3.

8. An emulsion of claim 4 wherein R is a $C_8$ to $C_{20}$ aliphatic radical; m and n are integers of from 1 to 6; and, p is an integer of from 0 to 3.

9. An emulsion of claim 1 wherein the quantity of emulsifying agent is 0.03 to 0.6% of the weight of the emulsion.

10. An emulsion of claim 1 wherein the bituminous binder is at least one member selected from the group consisting of bitumens modified with olefinic polymers, bitumens modified with olefinic polymers and grafted with elastomers, bitumens modified with mixtures of fatty acids and higher alcohols, bitumens modified with mixtures of fatty acids and higher alcohols and grafted with elastomers, bitumens modified with norbornine, bitumens modified with dihalogenopolybutadienes and block copolymers and co-vulcanizable elastomers, bitumens modified with polystyrene, polydiene block copolymers, bitumens modified with polystyrene/carboxylated polydiene block copolymers, bitumens modified with polyethylene waxes, bitumens modified with elastomeric acrylic polymers, bitumens modified with ethylene/vinyl acetate copolymers, and bituminous compositions obtained by contacting bitumen with a mother solution containing a petroleum or a coal oil, at least one styrene/butadiene block copolymer and a reactive agent.

11. An emulsion of claim 1 wherein the emulsion contains from 30 to 80% by weight of the bituminous binder.

12. The emulsion of claim 11 wherein the emulsion contains from 55 to 75% by weight of the bituminous binder.

13. An emulsion of claim 1 wherein at least one carboxylic acid is selected from the group consisting of formic acid, acetic acid, oxalic acid, succinic acid, phthalic acid, tartaric acid, maleic acid and citric acid.

14. A process for the preparation of a cationic emulsion of claim 1 which consists essentially of: introducing simultaneously and separately into an emulsion formation zone, the bituminous polymer binder in the form of a molten mass having a temperature of from 80° C. to 180° C. and a solution of an emulsifying agent containing a sufficient amount of a free carboxylic acid to provide a pH between 1 and 7 at a temperature comprised between 15° C. and 80° C. and maintaining the mixture in said emulsification zone for a sufficient length of time to form an emulsion.

15. The process of claim 14 wherein the bituminous binder is at a temperature of from 120° C. to 160° C.

16. The process of claim 15 wherein the solution of said emulsifying agent and said free acid is at a temperature of between 20° C. and 60° C.

17. A cationic emulsion of a bituminous binder comprising: a bituminous binder dispersed in an aqueous phase containing a cationic emulsifying agent and an acid, said acid being present in an amount sufficient to provide an aqueous phase having a pH of from 1 to 7, wherein the bituminous binder is a homogeneous solution of bitumen and at least one olefinic polymer, and wherein the acid consists essentially of at least one carboxylic acid selected from the group consisting of $C_1$ to $C_{20}$ saturated aliphatic monocarboxylic acids, $C_2$ to $C_{20}$ saturated aliphatic polycarboxylic acids, $C_2$ to $C_{20}$ unsaturated aliphatic monocarboxylic acids, $C_2$ to $C_{20}$ unsaturated aliphatic polycarboxylic acids, saturated $C_4$ to $C_{12}$ alicyclic monocarboxylic acids, unsaturated $C_4$ to $C_{12}$ alicyclic monocarboxylic acids, saturated $C_4$ to $C_{12}$ alicyclic polycarboxylic acids, unsaturated $C_4$ to $C_{12}$ alicyclic polycarboxylic acids, $C_7$ to $C_{12}$ aromatic polycarboxylic acids and hydroxyl derivatives of said acids.

* * * * *